United States Patent [19]

Gaynor et al.

[11] Patent Number: 5,548,418
[45] Date of Patent: Aug. 20, 1996

[54] HOLOGRAPHIC STRUCTURED LIGHT GENERATOR

[75] Inventors: Edwin S. Gaynor, Gaithersburg, Md.; Michael S. Massimi; William P. Blase, both of Alexandria, Va.; Abraham Isser, Silver Spring, Md.

[73] Assignee: DCS Corporation, Alexandria, Va.

[21] Appl. No.: 527,038

[22] Filed: Sep. 12, 1995

Related U.S. Application Data

[63] Continuation of Ser. No. 183,279, Jan. 14, 1994, abandoned.
[51] Int. Cl.$^6$ .................................. G02B 5/32; G03H 1/02
[52] U.S. Cl. .................................. 359/20; 359/10; 359/15; 359/28; 359/32; 359/34
[58] Field of Search ................................ 359/10, 11, 20, 359/28, 34; 356/347, 376; 385/30

[56] References Cited

U.S. PATENT DOCUMENTS

| | | | |
|---|---|---|---|
| 3,405,614 | 10/1968 | Lin et al. | 359/20 |
| 3,609,027 | 9/1971 | Lowenthal | 355/2 |
| 3,614,191 | 10/1971 | Sakaguchi et al. | 359/111 |
| 3,619,023 | 11/1971 | Brooks | 359/3 |
| 3,658,403 | 4/1972 | Greenaway et al. | 359/11 |
| 4,018,503 | 4/1977 | Silverman et al. | 359/11 |
| 4,082,415 | 4/1978 | Brooks et al. | 359/20 |
| 4,175,862 | 11/1979 | DiMatteo et al. | 356/375 |
| 4,294,544 | 10/1981 | Altschuler et al. | 356/376 |
| 4,310,216 | 1/1982 | Pellaux | 359/7 |
| 4,523,809 | 6/1985 | Taboada et al. | 359/577 |
| 4,669,812 | 6/1987 | Hoebing | 359/9 |
| 4,907,847 | 3/1990 | Onayama et al. | 359/19 |
| 4,948,258 | 8/1990 | Caimi | 356/376 |
| 4,950,050 | 8/1990 | Pernick et al. | 359/20 |
| 4,998,787 | 3/1991 | Caputi et al. | 359/20 |
| 5,016,954 | 5/1991 | Onayama et al. | 359/15 |
| 5,093,802 | 3/1992 | Hait | 364/807 |
| 5,170,269 | 12/1992 | Lin et al. | 359/9 |

FOREIGN PATENT DOCUMENTS 57-195204  11/1982  Japan .

OTHER PUBLICATIONS

M. D. Altschuler et al., "The Numerical Stereo Camera," Proc. SPIE, vol. 238, p. 15, 1981.

M. D. Altschuler et al., "Laser Electro–Optic System for Rapid Three–Dimensional (3–D) Topographic Mapping of Surfaces," Opt. Eng., vol. 20, p. 953, 1981.

M. Asada, H. Ichikawwa and S. Tsuji, "Determining Surface Orientation by Projecting a Stripe Pattern," IEEE Transactions on Pattern Analysis and Machine Intelligence, vol. 10, No. 5, pp. 749–754, Sep. 1988.

L. P. Boivin, "Multiple Imaging Using Various Types of Simple Phase Gratings," Applied Optics, vol. 11, No. 8, pp. 1782–1792, Aug. 1972.

K. L. Boyer and A. C. Kak, "Color–Encoded Structured Light for Rapid Active Ranging," IEEE Transactions on (List continued on next page.)

*Primary Examiner*—Martin Lerner
*Assistant Examiner*—Darren E. Schuberg
*Attorney, Agent, or Firm*—Crowell & Moring

[57] ABSTRACT

The present invention is a holographic structured light generator (HSLG) for generating an array of an arbitrary number of laser beamlets from a single laser beam using a point laser light source and a hologram. In a first preferred embodiment of the present invention, a hologram having an image of four point sources in a common plane is fabricated using four point sources as the object beam, and a reference beam. A reconstruction beam, aligned identically with respect to the hologram as was the reference beam during fabrication of the hologram, is then directed at the hologram, generating the array of laser beamlets from the four point sources in the hologram. In a primary application of the HSLG, it is used to map the surface of an object in three dimensions. The HSLG is used with video cameras, computer image processing equipment and an optical spatial light modulator to yield 3-D data for use with CAD systems.

93 Claims, 4 Drawing Sheets

OTHER PUBLICATIONS

Pattern Analysis and Machine Intelligence, vol. PAMI-9, No. 1, pp. 14–28, Jan. 1987.

W. S. Colburn and K. A. Haines, "Volume Hologram Formulation in Photopolymer Materials," Appl. Opt., vol. 10, p. 1636, 1971.

H. Dammann and K. Gortler, "High–efficiency In–Line Multiple Imaging by Means of Multiple Phase Holograms," Optics Communications, vol. 3, No. 5, pp. 312–315, Jul. 1971.

G. Groh, "Multiple Imaging by Means of Holograms of Correlated Objects," Applied Optics, vol. 8, No. 5, pp. 967–969, May 1969.

G. Groh, "Multiple Imaging by Means of Point Holograms," Applied Optics, vol. 7, No. 8, pp. 1643–1644, Aug. 1968.

P. Hariharan, "Holographic Recording Materials: Recent Developments," Opt. Eng., vol. 19 p. 636, 1980.

D. D. Harrison and M. P. Weir, "High–Speed Triangulation––Based 3–D Imaging with Orthonormal Data Projections and Error Detection" IEEE Transactions on Pattern Analysis and machine Intelligence, vol. 12, No. 4, pp. 409–416, Apr. 1990.

L. Hong, "3–D Scene Reconstruction Using Optimal Information Fusion," SPIE, vol. 1383, pp. 333–344, 1990.

W. J. Hossack, P. McOwan and R. E. Burge, "Computer Generated Optical Fan–Out Element," Optics Communications, vol. 68, No. 2, pp. 97–102, Sep. 1988.

G. Hu and G. Stockman, "3–D Surface Solution Using Structured Light and Constraint Propagation," IEEE Transactions on Pattern Analysis and Machine Intelligence, vol. 11, No. 4, pp. 390–402, Apr. 1989.

R. T. Ingwall and H. L. Fielding, "Hologram Recording with a New Photopolymer System," Opt. Eng., vol. 24, No. 5, p. 808, 1985.

J. R. Leger and G. J. Swanson, "Efficient array illuminator using binary–optics phase plates at fractional–Talbot planes," Optics Letters, vol. 15, No. 5, pp. 288–290, Mar. 1990.

A. W. Lohmann and J. A. Thomas, "Making an array illuminator based on the Talbot effect," Applied Optics, vol. 29, No. 29, pp. 4337–4340, Oct. 1990.

A. W. Lohmann, J. Schwider, N. Streibl and J. Thomas, "Array illuminator based on phase contrast," Applied Optics, vol. 27, No. 14, pp. 2915–2921, Jul. 1988.

P. C. H. Poon, D. R. Selviah, J. E. Midwinter, D. Daly and M. G. Robinson, "Design of a microlens based total interconnection for optical neural networks," OTuaA9–2 through 9–4, pp. 46–49.

P. W. Rhodes and D. L. Shealy, "Refractive optical system for irradiance redistribution of collimated radiation: their design and analysis," Applied Optics, vol. 19, No. 20, pp. 3545–3553, Oct. 1980.

K. Sato and S. Inokuchi, "Three–Dimensional Surface Measurement by Space Encoding Range Imaging," Journal of Robotic Systems, pp. 27–39, 1985.

N. Shrikhande and G. Stockman, "Surface Orientation from a Projeted Grid," IEEE Transactions on Pattern Analysis and Machine Intelligence, vol. 11, No. 6, pp. 650–655, Jun. 1989.

D. R. Smth and T. Kanade, "Autonomous Scene Description with Range Imagery," Computer Vision Graphics and Image Processing, vol. 31, pp. 322–334, 1985.

N. Streibl, "Beam shaping with optical array generators," J. Mod. Opt., vol. 36, pp. 1559–1573, 1989.

M. Suk et al., "Three–Dimensional Object Recognition from Range Images," Springer–Verlag, New York, 1992.

D. Terzopoulos and M. Vasilescu, "Adaptive Surface Reconstruction," SPIE, vol. 1383, pp. 257–264, 1990.

P. Vuylsteke and A. Oosterlinck, "Range Image Acquisition with a Single Binary–Encoded Light Pattern," IEEE Transactions on Pattern Analysis and Machine Intelligence, vol. 12, No. 2, pp. 148–164, Feb. 1990.

Y. F. Wang, A. Mitiche and J. K. Aggarwal, "Computation of Surface Orientation and Structure of Objects Using Grid Coding," IEEE Transactions on Pattern Analysis and Machine Intelligence, vol. PAMI–9, No. 1, pp. 129–137, Jan. 1987.

P. M. Will and K. S. Pennington, "Grid Coding: A Preprocessing Technique for Robot and Machine Vision," Artificial Intelligence 2, pp. 319–329, 1971.

"Triangulation Sensors," Chapter 2, Range Image Sensors.

Airgage Company product brochure, "Cadeyes™ Desktop 3–Dimensional Measuring System" 1993.

CyberOptics product brochure, "CyberScan Profiling Systems," 1988.

Cyberware product brochure, "Rapid 3D Color Digitizer Model 3030" 1992.

ELOR Optronics Ltd., product brochure, "3–D Non Contact Airfoil Measurement System," publication date unknown.

EOIS product brochure, "MK VII 3–D Surface Profiler," publication date unknown.

Imageware product brochure, "Surfacer," publication date unknown.

Laser Design Inc. product brochure, "3D Laser Digitizing Systems, Software & Services," publication date unknown.

MTI Instruments product brochure, "MTI–2000 Fotonic Sensor," publication date unknown.

Optical Gaging Products, Inc. product brochure, "P/N 531605 QSEE Turbo 200," 1989.

Precision Interntaional Corporation product brochure, "Precision CM3000, 3–Axis Non–Contact Coordinate Measuring System," publication date unknown.

Pacific Precision Laboratories, Inc. product brochure, "VideoCMM™ Measuring Microscope," publication date unknown.

Rodenstock Precision Optics, Inc. product brochure, "RM6000 A new Approach to Surface Measurement," 1991.

RSVI product brochure, "HR–2000 Systm Features," publication date unknown.

Seatex product brochure, "3–D Imaging for Underwater Inspection and Surveying: Spotacan Flying Spot Laser Scanner," publication data unknown.

View Engineering, Inc. product brochure, "Voyager 1000," publication date unknown.

HOLOGRAPHIC STRUCTURED LIGHT GENERATOR

This is a continuation of application Ser. No. 08/183,279 filed on Jan. 14, 1994, now abandoned.

BACKGROUND

1. Field of the Invention

The present invention relates to apparatus using holograms for the generation of arrays of light beamlets from a single beam input, and to the use of such apparatus to map the surface of an object.

2. Background of the Invention

Apparatus for optically generating arrays of coherent light beamlets from a single laser beam input can have wide-ranging applications. For example, such apparatus can be used in three important fields: optical computing, three-dimensional machine vision, and non-contact optical inspection. In optical computing, parallel individually-modulated light beams carry information through mathematical operations and deliver very fast and inexpensive solutions to complex problems heretofore solvable only using electronic supercomputers and massively-parallel specialized electronic processors. An optical computing method for accomplishing optical logic operations is described in U.S. Pat. No. 5,093,802 to J. N. Hait. Generation of the beamlet array for optical computing is accomplished in a variety of ways. For example, beamlet arrays for optical computing have been generated using a monolithic array of lenslets, fabricated using advanced lithographic and micromachining techniques; using holograms of lenslet arrays; or using a computer-calculated mask of an optical phase pattern.

For three-dimensional machine vision and non-contact inspection, a beamlet array is used to project a structured light pattern onto the surface to be measured. For example, U.S. Pat. No. 4,948,258 to Caimi discloses an apparatus for mapping a surface by passing a laser beam through a holographic grating structured to project a two-dimensional array of beamlets onto a surface, and then using a video camera to record the image of the beamlets reflected from the surface. The holographic grating is constructed using an array of lenslets. Other applications are described in "Three-Dimensional Object Recognition from Range Images,? M. Suk et al., Springer-Verlag, N.Y. (1992).

Surface profiling systems, many of which use laser scanning, are now commercially available, including, e.g., Cyberware's Rapid 3D Digitizer Model 3030, Airgage Co.'s CADEYES, CyberOptics's CyberScan, View Engineering's Voyager 1000, Seatex's Spotscan, RVSI's HR-2000, Rodenstock's RM600, Precision International's CM3000, Pacific Precision Laboratories' VideoCCM, Optical Gaging Products' QSEE Turbo 200, Mechanical Technology's MTI-2000, Laser Design's 3D Laser Digitizing System, EIIS's MK VII 3-D Surface Profiler, ELOR Optronics' 3-D Non Contact Airfoil Measurement System and Imageware's Surfacer.

Array-based active structured light inspection systems are described in "The Numerical Stereo Camera," M. D. Altschuler et al., Proc. SPIE Vol 283, p. 15 (1981) and in "Laser Electro-Optic System for Rapid Three Dimensional (3-D) Topographic Mapping of Surfaces," M. D. Altschuler et al., Opt. Eng. vol. 20, p. 953 (1981). This system generates a beamlet array using a lens to make a laser beam diverge, a four-facet prism to generate four virtual sources, and a microscope objective lens to produce a demagnified real image of the virtual sources. A video camera records the reflection of the beamlet array off the surface to be mapped. The beamlet array passes through a spatial light modulator (SLM) so that the individual beamlets can be identified.

U.S. Pat. No. 4,523,809 to Taboada et al. discloses an apparatus for generating an array of laser beamlets using a single laser beam and a four-facet prism. Because the laser beam is diverging, the prism introduces high optical aberrations. The prism-based system also requires very stringent alignment, which in turn necessitates heavy and costly support structures.

N. Streibl, in "Beam Shaping with Optical Array Generators," J. Mod Opt., 36, p. 1559 (1989) discloses another apparatus for generating an array of beamlets from a single input beam, using a computer generated hologram (CGH). Computer-generated holograms are described in U.S. Pat. No. 4,998,787 to Caputi et al., which is incorporated by reference herein. This technique is most effective for arrays of no more than 256×256 beams. A CGH is a calculated holographic pattern printed onto a photosensitive medium such as photographic film using lithographic techniques.

SUMMARY OF THE INVENTION

The present invention is a Holographic Structured Light-Generator ("HSLG"). An HSLG is an apparatus for producing a coherent array of beamlets from a single laser beam using a hologram having an image of four point sources originating from a common plane. When a single laser beam is directed at the hologram, the light from the four point sources interferes as it propagates, forming interference patterns in space. The high and low intensities of the interference patterns are periodically arranged in planes. Laser beamlets are formed by intersections of the planes of interference. The relative locations of the four sources in their common plane determines the periodicity of the interference, and hence defines the array of laser beamlets.

Fabrication of the Hologram

FIG. 1 shows the optical setup for fabricating the hologram for use in the HSLG. As shown in FIG. 1, a laser beam produced by laser 1 is directed at beamsplitter 2, where the beam is divided into the first and second beams. The first beam passes through beamsplitter 2 and microscope objective 3, which focuses the first beam onto the first end 4 of single-mode optical fiber 5. The first beam passes through single-mode optical fiber 5 and exits at the second end 6 of single-mode optical fiber 5. The beam exits the second end 6 of single-mode optical fiber 5 as a diverging beam directed at holographic medium 7. This beam is called the reference beam.

The second beam reflects off beamsplitter 2 onto a second beamsplitter 8 where it is divided into a third beam and a fourth beam. The third beam reflects off beamsplitter 8, and is coupled using microscope objective 9 into the first end 10 of second single-mode optical fiber 11, and exits the second end 12 of single-mode optical fiber 11. The fourth beam transmits through beamsplitter 8 onto a third beamsplitter 13, where it is divided into a fifth beam and a sixth beam. The fifth beam reflects off the beamsplitter 13 and is coupled using microscope objective 14 into the first end 15 of third single-mode optical fiber 16, and exits at the second end 17 of single-mode optical fiber 16. The sixth beam transmits through beamsplitter 13 onto fourth beamsplitter 18 where it is divided into a seventh beam and an eighth beam. The seventh beam reflects off beamsplitter 18 and is coupled using microscope objective 19 into the first end 20 of fourth single-mode optical fiber 21, and exits at the second end 22 of single-mode optical fiber 21. The eighth beam transmits through beamsplitter 18 onto mirror 23. It reflects off mirror 23 and is coupled using microscope objective 24 into the first end 25 of fifth single-mode optical fiber 26, and exits at the second end 27 of single-mode optical fiber 26. The beams exiting the four fiber ends 12, 17, 22 and 27 collectively comprise the object beam. The four fiber ends are positioned in a common plane on the four corners of a square. The object beam exiting from the four coplanar fiber ends is directed at holographic medium 7.

The object and reference beams combine at holographic medium 7. Holographic medium 7 is a light sensitive photographic emulsion on a clear glass substrate. The emulsion records the interference pattern produced by the combination of the object and reference beams. After exposure, the holographic medium is processed using standard processing techniques. The processed medium is the hologram.

The hologram will produce an object beam upon illumination by a reconstruction beam. This reconstruction step is described with reference to FIG. 2a, which shows how the object beam of FIG. 1 is regenerated. In FIG. 2a, a beam from laser 28 is focussed by microscope objective 29 onto the first end 30 of single-mode optical fiber 31. The beam exits at the second end 32 of single-mode optical fiber 31. Hologram 33 occupies the same position and orientation relative to single-mode optical fiber end 32 as did the holographic medium relative to single-mode optical fiber end 6 during exposure of the holographic medium. The beam exiting from single-mode optical fiber end 32 is the reconstruction beam which illuminates hologram 33. If the hologram has been exposed and processed correctly, the effect of the reconstruction beam propagating through hologram 33 is the generation of an object beam. The object beam will have the same properties as the object beam used to fabricate the hologram.

The HSLG can be used with a wide range of optical wavelengths, from the ultraviolet (360 nm) through the near infrared (800 nm). Several recording materials have been used to make the holograms, including film and plate-backed emulsions of silver halide, various photopolymers manufactured by Dupont (described in "Volume Hologram Formulation in Photopolymer Materials," W. S. Colburn and K. A. Haines, Appl. Opt. vol. 10, p. 1636 (1971)) and by Polaroid (e.g., DMP-128, described in "Hologram Recording with a New Photopolymer System," R. T. Ingwall and H. L. Fielding, Opt. Eng. 24, 5, p. 808 (1985)). Holograms have also been fabricated using thermoplastic polymers, dichromated gelatin, various photoresist and photochromic materials, and photorefractive crystals. These materials are described in "Holographic Recording Materials: Recent Developments," P. Hariharan, Opt. Eng. vol. 19, p. 636 (1980), which is incorporated by reference herein.

Theoretical Background of the Invention

This section will Show how an array of beamlets can be generated by illuminating a hologram with a reconstruction beam. The beamlets are formed by the interference between the four object beams, as they propagate away from the point sources. The beamlets are separated by interference planes extending throughout the volume determined by the intersection of the four beams. The intersection volume extends from a plane between the hologram and the point sources on to infinity.

The laser intensity at wavelength ($\lambda$) at any (z) point along the optical axis of the object beam in any (x, y) cross section perpendicular to the optical axis of the object beam is given by:

$$I = A^2(4 + 4\cos(2ax) + 4\cos(2ay) + 2\cos 2a(x+y) + 2\cos 2a(x-y)) \quad (1)$$

where $$a = \frac{\pi d}{\lambda z} \quad (2)$$

where A is the amplitude of the electric field vector, and d is the separation between two adjacent corners in the square four point array, as shown in FIG. 3b (discussed below). The optical axis of the object beam is defined during fabrication of the hologram. It is the line which passes through any point equidistant from the four point sources and is perpendicular to their common plane. The first term in Equation (1) arises from the fact that there are four beams of equal amplitude A. The second and third terms arise from the interference between the point sources separated by a distance equal to the side d of the square four-point array. There are two cosine patterns in the x direction and two in the y direction. The fourth and fifth terms arise from the interference between the sources separated by the diagonals across the square array. There are therefore six interference patterns.

Equation (1) can be simplified as follows. Grouping the first term with the fourth and fifth terms and simplifying:

$$I = rA^2(\cos^2 a(x+y) + \cos^2 a(x-y) + \cos(2ax) + \cos(2ay)) \quad (3)$$

Equation (3) can be further simplified to eliminate the third and fourth terms, yielding:

$$I = 4A^2(\cos^2(a(x+y)) + \cos^2(a(x-y)) + 2(\cos(a(x+y))\cos(a(x-y))) \quad (4)$$

This expression can be simplified still further, yielding:

$$I = 16A^2 \cos^2(ax)\cos^2(ay) \quad (6)$$

Equations (2) and (5) determine the periodicity of the array.

More specifically, we can calculate the periodicity of the array given the distance z between the point sources and the screen, and given the distance between adjacent point sources d. For example, if a He-Ne laser is used having a wavelength of $0.6328 \times 10^{-3}$ mm with a source separation of 0.6 mm, there will be a 128×128 array on a screen placed at z=740 mm, within a square 50 mm on a side. This follows from the periodic $\cos^2()$ function, which is zero when its argument is equal to odd multiples of $\pi/2$ and is a maximum when its argument is equal to even multiples of $\pi/2$. A circular portion of the cross section of the beamlet array pattern is shown in FIG. 2b.

The remaining parameters in the design of the hologram are: (1) the distance between the holographic medium and the point sources (ends 12, 17, 22 and 27 of single-mode optical fibers 11, 16, 21 and 26, respectively) in the object beam; (2) the distance between the holographic medium and the end 6 of single-mode optical fiber 5 in the reference beam; and the orientation of the holographic medium with respect to the optical axis. These are determined based on the numerical aperture of the fibers and the desired size of the hologram. For the numerical aperture (N.A.) defined as the sine of the half-angle $\Theta$ of the diverging beam exiting the single-mode fiber, the size s of the intercepted area on the holographic medium is defined as:

$$s = 2l\tan(\theta) = 2l \frac{N.A.}{\sqrt{1-(N.A.)^2}}$$

where l is the distance along the optical axis between the plane of the fiber sources and the holographic medium, oriented perpendicular to the optical axis. For example, if the desired hologram diameter is s=25 mm, and the N.A. is 0.1, then l=124 mm. Note also that tipping the holographic medium by the angle α increases the size of the intercepted area to s'=s/cos(α). However, the orientation of the holographic medium relative to the optical axis will affect the hologram efficiency and the position of surface reflections.

Imaging Applications

The HSLG is particularly well-suited to 3-D imaging applications, including machine vision and non-contact inspection. In such applications, the HSLG generates the beamlet array needed for 3-D imaging. As shown in FIG. 3a, the 3-D imaging system also includes one (or possibly more than one) video camera 50, sensitive to the illuminating wavelength and an image processing module 62. Image processing module 62 registers the image recorded by video camera 50 with respect to the structured light illumination. Standard CCD video cameras, available from, e.g., Cohu or Sony, are adequate for modest speeds. Higher frame rate cameras (e.g., Rotron MC9256EAC) can be used for high speed applications.

Registration of the video image with the structured light illumination can be achieved using a single video frame and richly patterned structured light. Alternatively, it can also be achieved using multiple video frames and relatively simpler patterned illumination. In the case of the richly patterned HSLG, the beamlet pattern is spatially modulated in a sequence consisting of two patterns: a beamlet array and an overlaid pattern. The beamlet array, instead of being a regular periodic array, is spatially coded with a pattern consisting of "on" and "off" beamlets. The encoded array is unique over limited regions wherein absolute registration can be accomplished. In order that both on and off beamlets can carry information, a second pattern containing interfaces between dark and light regions, one interface for each beamlet location, is overlaid on the coded beamlet pattern. An example of the overlaid pattern is a checkboard pattern, as shown in FIG. 2e, with the dark and light region corners placed at beamlet locations. An example of a spatial code pattern is a pseudo-random noise pattern, as shown in FIG. 2d. A pseudo-random noise pattern is a sequence of on and off bits in a digital stream, each bit generated by an iteration of a mathematical algorithm. The sequence is repeatable but the arrangement of bits within the sequence has random properties.

For three dimensional triangulation imaging using a single video frame, a richly structured beamlet array can be used for registration. Within overlapping windows of $\log_2 N$ beamlets in the camera image (N=number of rows or columns), absolute registration can be accomplished with the appropriate processing algorithms. For example, if the HSLG contains the checkerboard pattern shown in FIG. 2e and the coded array, the pseudo-random noise code (shown in FIG. 2c) is placed on the regular beamlet array during fabrication of the hologram using a spatial light modulator. The checkerboard pattern is overlaid during fabrication using a checkerboard-modulated reference beam.

FIG. 5 schematically depicts the fabrication of a holographic structured light generator for a richly patterned beamlet array for single frame registration. The hologram fabrication is similar to that required for simply patterned beamlet arrays except that a spatial light modulator is used in the fabrication step to modulate the beamlet array according to some spatial code pattern (e.g., a pseudo-random noise pattern, shown in FIG. 2d). Accordingly, spatial light modulator 60 is placed between the plane containing optical fiber sources 56 and holographic medium 57. A checkerboard pattern of transparent and opaque apertures 58, as shown in FIG. 2e, realized, e.g., on a photographic slide, is placed in the reference beam between the reference beam fiber end 59 and the holographic medium 57. The hologram is recorded and processed as described above. The result on reconstruction is a richly structured pattern containing the overlay of a coded beamlet array and a checkerboard. This pattern can be projected onto a three-dimensional object for imaging. The reconstruction is performed identically to the reconstruction shown in FIG. 3a. However, only a single video frame need be collected.

In the system shown in FIG. 3a for multiple video frame registration, laser 35 illuminates lens 36 which focuses laser light into the first end 37 of a single mode fiber 38. Laser light exits fiber 38 at the fiber second end 39 and illuminates hologram (HSLG) 40. The HSLG forms point sources 41, 42, 43, 44, which characterize the beamlet array leaving the HSLG, as shown in crossection in FIG. 2b. The beamlet array is incident upon a spatial light modulator (SLM) 46. SLM 46 is placed at a position along the optical axis such that the beamlets align with the square SLM aperture array, shown in FIG. 3c.

Specific patterns of electrical signals are sent to the SLM to open and close rows and columns of apertures to modulate the structured illumination. The modulated beamlet array strikes 3-D object 49. Object 49 is shown in FIG. 3a as a turbine blade, illustrating the application of the present invention to the safety inspection of aircraft engine turbine blades.

Video camera 50 is directed with its optical axis (i.e., the line through the center of video camera lens and perpendicular to the lens surface) non-parallel to the optical axis of the HSLG illuminator such that the illuminated object is imaged in the video camera's image plane.

As described in J. A. Jalkio, R. C. Kim, S. K. Case, "Three Dimensional Inspection Using Multistripe Structured Light," Opt. Eng. 24, No. 6, p. 966 (1985), which is incorporated herein by reference, a 3-D map of an object can be calculated using triangulation from the identification of each image location with the correct source location, i.e., by registration of the video camera image relative to the HSLG's array of beamlets. In the present invention as shown in FIG. 3a, registration comprises identification of illuminated locations in the video image with the line on the SLM through which the illuminating beamlets passed.

Registration of the beamlet array with the video camera image is achieved by opening the apertures in the SLM according to a binary sequence of patterns of open-apertured columns. For an SLM consisting of N columns of apertures, the nth pattern ($1 \leq n \leq \log_2 N - 1$) consists of $N/(2^n)$ closed columns adjacent to $N/(2^n)$ open columns repeated n times across the entire SLM aperture array. Accordingly, since the structured light patterns exist for one frame time apiece, the column is registered in $\log_2 N - 1$ frames. For an SLM of N=128 columns, $\log_2 N - 1 = 6$ frames for the minimum data acquisition period for registration. This registration technique is described in M. Suk, S. M. Bhandarkar, "Three-Dimensional Object Recognition from Range Images," Springer-Verlag, Tokyo (1992), which is incorporated herein by reference. If registration is performed for both rows and columns, the resulting redundancy can be used for noise reduction.

Registration and triangulation algorithms produce a point cloud which can be used as the input to a special purpose CAD systems. For example, Laser Design's DataSculpt converts the point cloud into surfaces in 3-D space. These surfaces are then used as inputs for object recognition and inspection algorithms.

Alternatively, the HSLG can be used as a source of richly patterned structured light in a single frame imager. Richly structured light affords instant registration by codifying individual beams in the beamlet array. Codes can be realized with color variation as described by K. L. Boyer, A. C. Kak, "Color-Encoded Structured Light for Rapid Active Ranging," IEEE Trans. Pattern Analysis and Machine Intelligence, PAMI 9, Number 1, p. 14 (1987), which is incorporated herein by reference, or with overlaid patterns, as described by P. Vuylsteke, A. Oosterlinck, "Range Image Acquisition with a Single Binary-Encoded Light Pattern," IEEE Trans. Pattern Analysis and Machine Intelligence, PAMI 12, Number 2, p. 148 (1990) which is incorporated herein by reference. The beamlet array can be color coded with the addition of a white-light illuminator with spatially-varying color filtering in-line with the laser line illuminator. Overlaid patterns can be produced with an additional hologram superimposed over the HSLG in the same photographic emulsion.

The HSLG could also be used to generate a beamlet array superimposed over one (or more than one) additional pattern in order to facilitate its use in a 3-D imaging system, thus providing 3-D triangulation mapping in a single video frame.

Accordingly, it is an object of the present invention to provide an apparatus for generating an arbitrarily large coherent array of beamlets from a single coherent source.

It is another object of the present invention to provide a relatively inexpensive and compact apparatus for generating a coherent array of beamlets from a single source.

It is another object of the present invention to provide an apparatus for generating a coherent array of beamlets that is easily aligned.

It is another object of the present invention to provide an apparatus for generating a coherent array of beamlets without using lithography or computer calculations.

It is another object of the present invention to provide an apparatus for three-dimensional imaging of objects and surfaces.

These and other objects of the present invention are described in greater detail in the detailed description of the invention, the appended drawings and the attached claims.

DETAILED DESCRIPTION OF PREFERRED EMBODIMENTS OF THE INVENTION

Preferred embodiments of the present invention are described herein in terms of laser beams. However, the present invention can be implemented using any type of electromagnetic beams, including microwave, millimeter wave, infrared, optical, ultraviolet or x-ray beams.

Figure 2A:
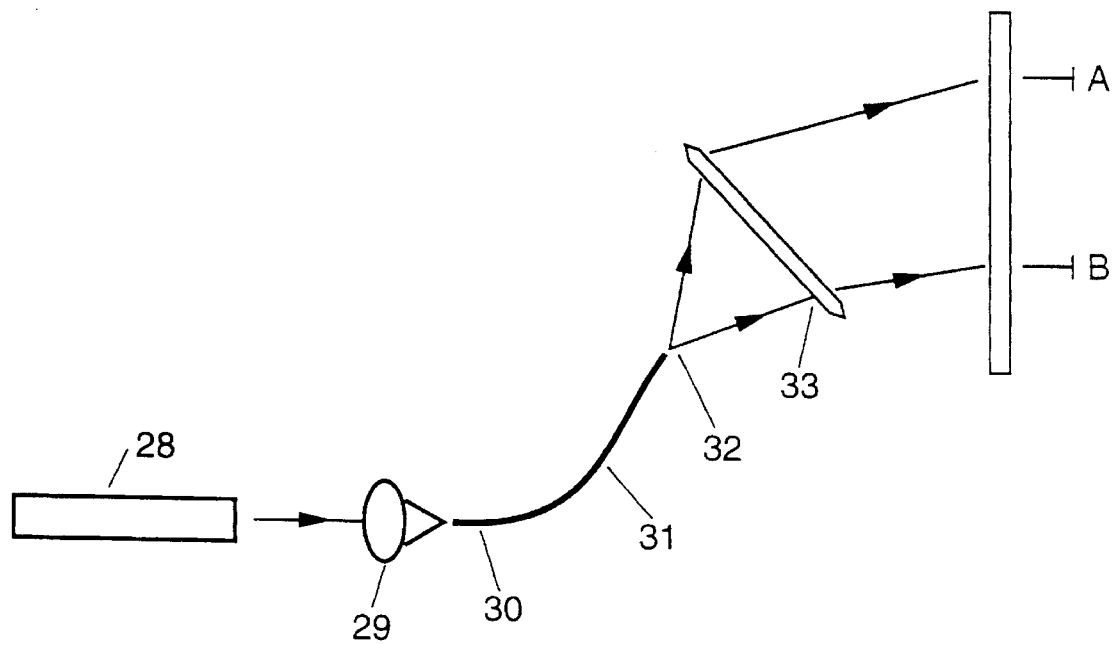
FIG. 2a is a schematic diagram of the apparatus used to project an array of laser beamlets according to the first preferred embodiment of the present invention.
Figure 3A:
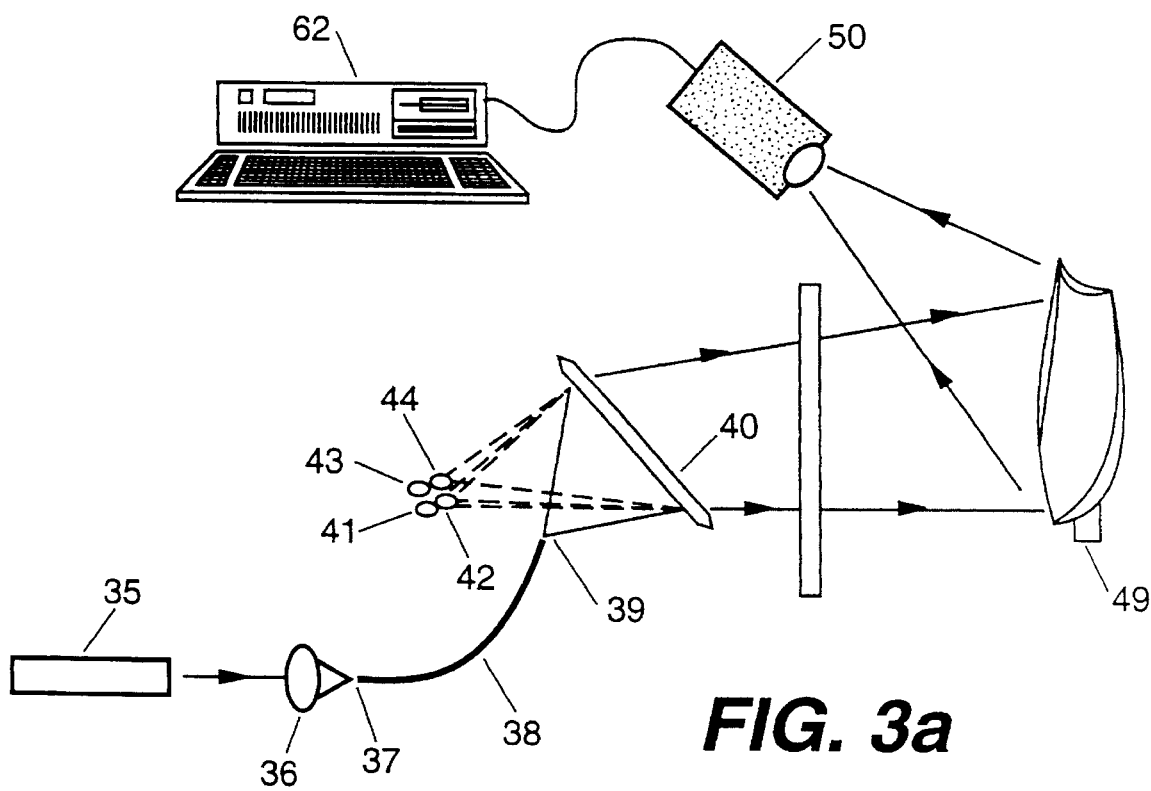
FIG. 3a is a schematic diagram of the apparatus used to project an array of laser beamlets according to the first preferred embodiment of the present invention.
Figure 3B:
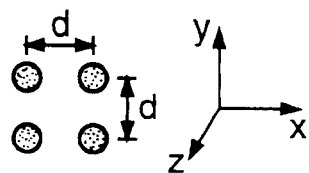
FIG. 3b is a schematic diagram showing an example of the positions for the point sources used to create the hologram of the present invention.
Figure 3C:
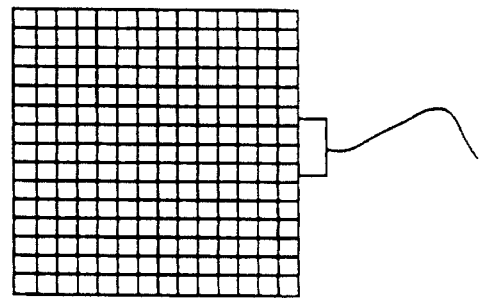
FIG. 3c is a schematic diagram of a square spatial light modulator array.

A first preferred embodiment of the present invention is shown in FIGS. 2a and 3a. FIG. 3a shows a laser beam produced by laser 35 focussed by microscope objective 36 onto one end 37 of single-mode optical fiber 38 having a diameter of, e.g., $4 \times 10^{-3}$ mm. The beam passes through single-mode optical fiber 38 and exits at the second end 39 of single-mode optical fiber 38, as a diverging beam directed to hologram 40. This reconstruction beam generates four new beams, each one diverging from its own point source 41, 42, 43 and 44.

Figure 2B:
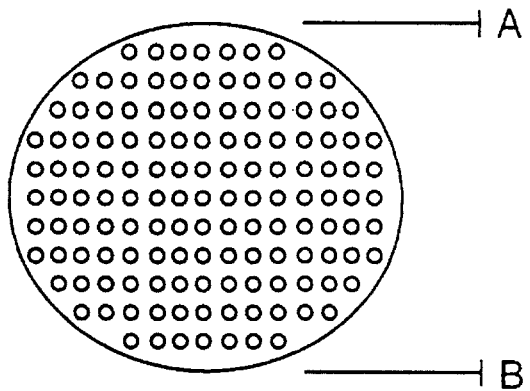
FIG. 2b is a schematic diagram of a cross section of the laser beamlet array produced according to the first preferred embodiment of the present invention.

The four diverging beams form interference planes throughout the volume defined by their intersection. This volume extends to infinity since the four beams are diverging. A cross section through this volume is an array of dots as shown in FIG. 2b. The array can contain any number of dots. The size and number of dots is determined by the design of the hologram, and the position of the point source 39 of the reconstruction beam. Moving the point source 39 toward the hologram reduces the number of beamlets. Moving the point source away from the hologram increases the number of beamlets. This movement is accomplished using micrometer-based adjustment platforms on which the appropriate components are mounted. These platforms, available from, e.g., the Newport Corporation and the New Focus Corporation, can be used to make tilt and rotational adjustments with submicrometer precision.

As in the example discussed above, the four virtual point sources of the hologram are coplanar and occupy the four corners of a square. A square side having a of 0.6 mm yields a 128×128 beamlet array over a 50 mm×50 mm area, at a distance of 740 mm for light of wavelength $0.6328 \times 10^{-3}$ mm. Because the interference planes extend to infinity, the present invention has an infinite depth of field.

Single-mode optical fiber 38 (obtained from, e.g., the 3M Company or the Newport Corporation) provides an easily-aligned laser point source. Adjustment of the second end 39 of single-mode optical fiber 38 in three orthogonal axes determines the propagation direction of the beamlet array, the cross sectional extent of the individual beamlets, and the number of beamlets within a given solid angle. The beamlet direction is determined by the location of the second end 39 of single-mode optical fiber 38 in the plane perpendicular to the reconstruction beam optical axis. That axis is defined with reference to the object optical axis, defined above, as follows: the reconstruction beam optical axis is defined as a line passing through the second single-mode optical fiber end 39 and intersecting the object optical axis at the hologram medium 40.

The beamlet magnification affects the size of the pattern and the size of the individual beamlets. The magnification can be adjusted by moving the second end 39 of single-mode optical fiber 38 along the reconstruction optical axis. Thus the magnification is continuously variable in the present invention. Most applications, however require that the beamlet array corresponds with a fixed size array pattern on a screen such as an array of detectors or shutters, as in an SLM. In these cases, adjustment along the optical axis serves to align the beamlet array to the screen.

Small deviations from 90 degrees in the angles defining the pattern corners will result if the hologram is not rotated to its correct position in its own plane. The "squareness" of the dot array produced by the beamlet array on the screen can be adjusted by angular rotation of hologram 40 in its plane, until its position matches that of the fabrication set-up (shown in FIG. 1). The dot pattern cross section will be square on any screen which is oriented perpendicular to the object optic axis.

In addition to being compact and low in weight, the present invention is light-efficient and low in aberrations. The light efficiency is greater than 37%. Aberrations are negligible with proper alignment. The coupling between alignment and aberrations is typical of holograms whose aberrations depend upon the disparities between the position and orientation of the reference beam during fabrication and the position and orientation of the reconstruction beam during illumination. With the proper alignment, the fabrication and reconstruction angles and positions are identical. Furthermore, small disparities in the position of the second end 39 of single-mode optical fiber 38 produce negligible aberrations. Larger disparities along the optical axis results in a scale change, but even these disparities produce negligible aberration.

Figure 1:
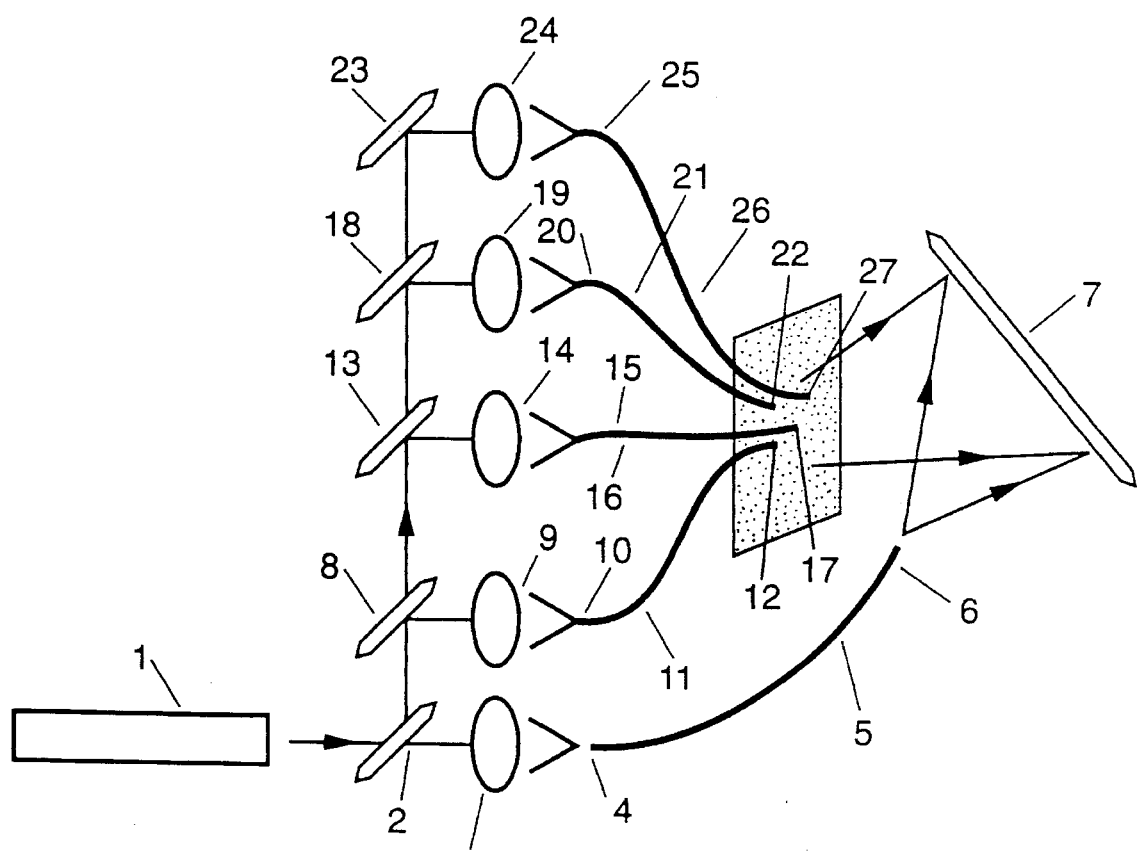
FIG. 1 is a schematic diagram of the apparatus used to fabricate a hologram according to the first preferred embodiment of the present invention.
Figure 2C:
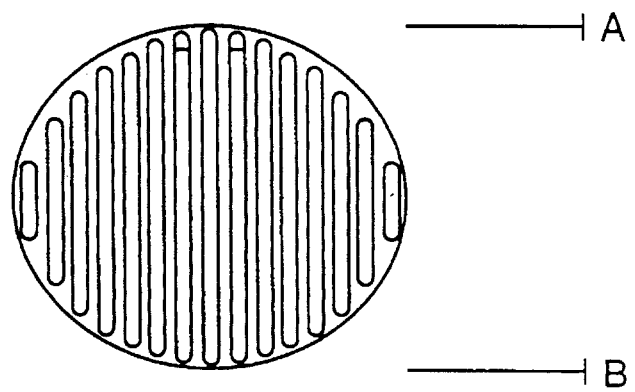
FIG. 2c is a schematic diagram of a cross section of the array of beamlets produced by the second preferred embodiment of the present invention.
Figure 2D:
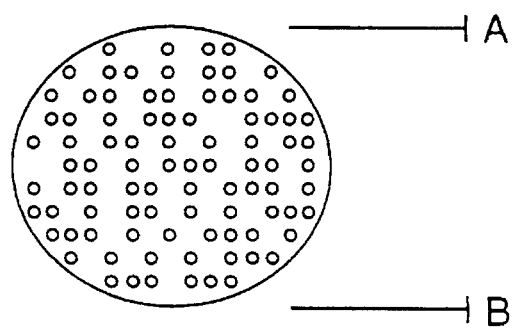
FIG. 2d is a schematic diagram of a cross section of an array of beamlets which is the first of two overlaid patterns produced according to the ninth preferred embodiment of the present invention.
Figure 2E:
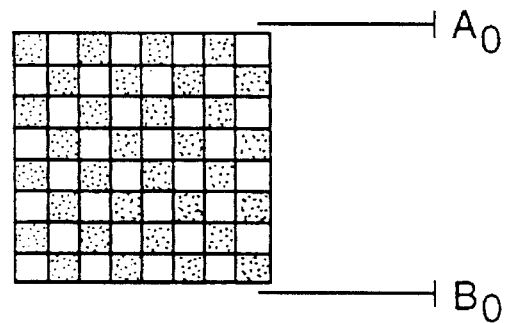
FIG. 2e is a schematic diagram of a cross section of a checkerboard pattern which is the second of two overlaid patterns produced according to the ninth preferred embodiment of the present invention.

In a second preferred embodiment of the present invention, a hologram having a two-point virtual image is fabricated using an optical setup similar to the one shown in FIG. 1, but having only two single-mode optical fibers. The object beam thus consists of two beams exiting from the ends of two single-mode optical fibers. The reference beam is the same as in the first embodiment. The reconstruction setup is the same as the setup for the hologram shown in FIG. 2a. However, reconstruction of this hologram produces an array of stripes, as shown in FIG. 2c, instead of the array of dots shown in FIG. 2b.

In a third preferred embodiment of the present invention, the hologram has a three-point image fabricated using an optical setup similar to the one shown in FIG. 1, but having three single-mode optical fibers. Upon reconstruction, this hologram would generate a pattern of dots arrayed at the vertices of adjacent triangles. If the ends of the three optical fibers are positioned at the vertices of an equilateral triangle, the dots will be circular. If the ends are positioned at the vertices of an isosceles triangle, the dots will be elongated.

A fourth preferred embodiment of the present invention is similar to the first preferred embodiment, but the four point sources (the second ends of single-mode optical fibers 11, 16, 21 and 26) are arranged on the corners of a rectangle rather than a square. Upon reconstruction, this hologram will generate beamlets which are elongated along one dimension relative to the other dimension.

The hologram may also be fabricated using other object beams, including, for example, a planar array of apertures, a lenslet array, or a multi-facet prism. A disadvantage of the multi-facet prism is that it introduces spherical aberrations into the object beam, which would then be recorded in the hologram.

Figure 4B:
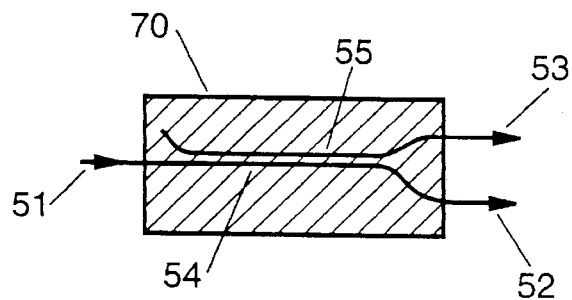
FIG. 4b is a schematic diagram of a fiber optic beamsplitter.
Figure 4A:
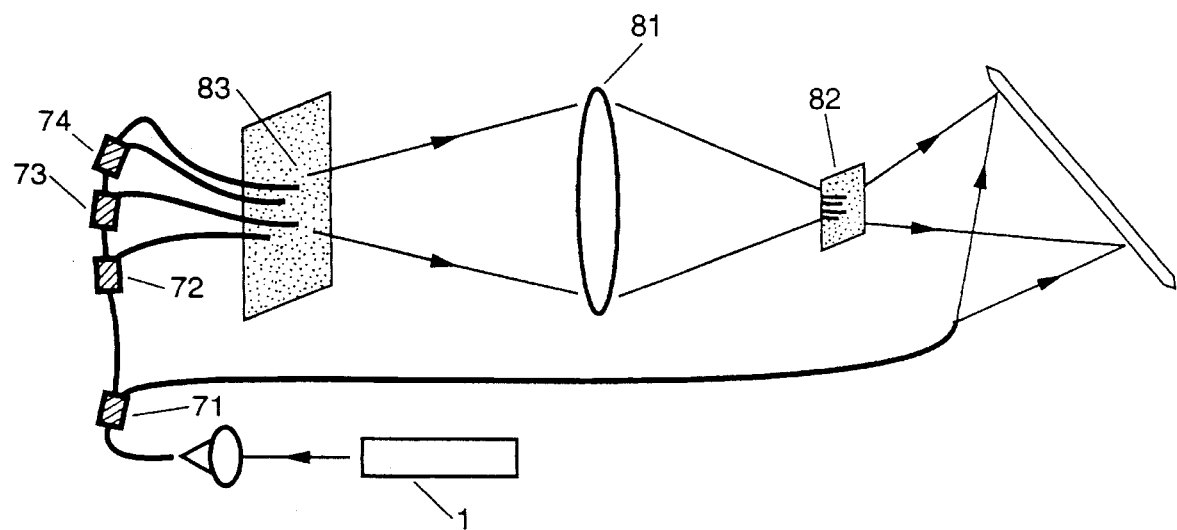
FIG. 4a is a schematic diagram of the present invention, implemented using fiber-optic beamsplitters.

In a fifth preferred embodiment of the present invention, a positive lens or lens combination is used to image the point sources. FIG. 4a shows that the effect of a positive lens 81 is to produce a real image 82 of point sources 83 at a new location along the object optical axis. The introduction of real sources affords an extension of the array size adjustment as well as the ability to easily switch from a four source to a two source (i.e., beamlet to stripe) array generator. Furthermore, since the real image of the sources can be made arbitrarily small with an adequately large magnification power in the positive lens, this embodiment relieves some of the difficulty of fabricating the hologram by allowing a larger separation of the object beam point sources, i.e., of the ends of the single-mode optical fibers.

However, the positive lens introduces additional spherical aberration in the point source images. Spherical aberration has the effect of extending the point sources in the direction of the optical axis, thus introducing a phase error in the description of the interference planes which form the beamlets. Thus, Equation (1) becomes, with aberration, $$I=A^2(4+4\cos(2ax+\Delta\Phi)+4\cos(2ay+\Delta\Phi)+2\cos 2a(x+y+\Delta\Phi)+2\cos 2a(x-y+\Delta\Phi)) \qquad (8)$$

With large arrays, (e.g. 1024×1024) this aberration has the effect of introducing undesirable phase reversals in the interference planes evidenced at the screen.

In a sixth preferred embodiment of the present invention, the hologram is fabricated using multiple holographic exposures. Either each object beam point, or partial combinations of the object beam points, are separately and sequentially exposed using a single reference beam for all exposures. This technique is simpler than the first preferred embodiment since only one point source needs to be used at a time. However, with this embodiment, the interference planes cannot be monitored for the effects of misplacement of the separate object beams.

The hologram may also be fabricated using Computer Generated Hologram (CGH) fabrication techniques, as described in U.S. Pat. No. 4,998,787 to Caputi et al., incorporated by reference above.

The present invention can be implemented using lasers operating throughout the electromagnetic spectrum, including He-Ne lasers operating at a wavelength of $0.6328\times 10^{-3}$ mm. For specific applications, a particular choice of wavelength for the laser beam may improve the measurement. For example, for medical applications, a laser generating a green beam could be more effective for body mapping since human tissue is most reflective in the green part of the spectrum.

In a seventh preferred embodiment of the present invention, an optical fiber is not used for the reconstruction beam. In this case, the beamlet array size can be adjusted by translating the laser/microscope objective combination along the reconstruction optical axis. The beamlet array position can be adjusted by translating the laser/microscope objective at right angles to the reconstruction optical axis. This embodiment is effective for point array or stripe array generation.

In an eighth preferred embodiment, plane 46 (see FIG. 3*a*) is a spatial light modulator (SLM).

Figure 5:
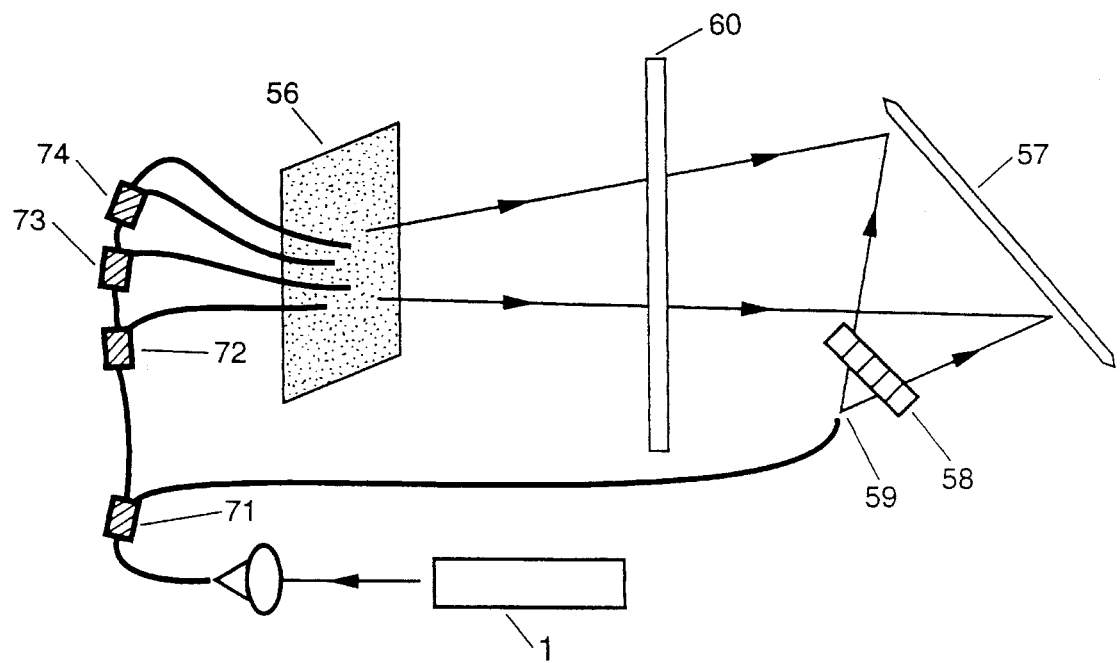
FIG. 5 is a schematic diagram of the apparatus used for fabricating a hologram for generating a richly patterned beamlet array.

In a ninth preferred embodiment of the present invention, the hologram is fabricated according to FIG. 5 to create a richly patterned beamlet array.

In another embodiment of the present invention, lenses are installed in the optical path subsequent to the spatial light modulator 46 to enlarge or reduce the size of the modulated beamlet array for various applications. The reflective, refractive or diffractive lenses accomplish a reimaging of the source points and therefore a resizing of the beamlet array. Note that since the resizing occurs subsequent to the SLM there is no need to realign the beamlet array to the SLM apertures with the change in the magnification.

In another embodiment of the present invention, the point sources generated by the processed HSLG are imaged by a lens placed between the HSLG and the SLM. Although this system is longer, heavier, more difficult to align, and more expensive than the first preferred embodiment, the introduction of real sources affords advantages identical to those of the fifth embodiment. However, since the lens is not used in the fabrication step, aberrations due to the lens are not recorded in the HSLG.

In other embodiments, the invention includes a reflective, refractive or diffractive scanner to redirect the beamlet array. A scanner equips the invention to acquire inspection information, for instance, across a surface that is larger than the beamlet array size. Accordingly, full surface inspections require a scan-acquire sequence.

Fiber-optic beamsplitters (available, e.g., from 3-M Company) can be used instead of bulk optical beamsplitters for fabrication of the HSLG. Fiber-optic beamsplitters afford a simpler setup with more facility to adjust the positions for the fiber ends. Fiber optic beamsplitters 71–74 are schematically drawn in the fabrication setup shown in FIG. 4*a* and FIG. 5. A schematic of a single fiber-optic beamsplitter is shown in FIG. 4*b*. Fiber-optic beamsplitter 70 splits the incoming beam 51 evenly into two outgoing beams 52 and 53. Light is transferred as a result of two beam channels 54 and 55 passing close enough to one another that the evanescent portion of the light waveform in the first channel 54 overlaps the second channel 55. All guided electromagnetic waves comprise these evanescent waves. They can be regarded as the imaginary part of the solution of the wave equation describing passage of an electromagnetic disturbance through a guiding channel.

Three-dimensional imaging could be carried out without using a hologram. For example, the optical set-up shown in FIG. 1 could be used to directly illuminate the object. However, in that case the optical fibers in the apparatus would be extremely sensitive to random temperature, humidity and air current vibrations.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus for generating an array of electromagnetic beamlets comprising:
    (a) a hologram having an image of three phase-controlled point sources;
    (b) a reconstruction electromagnetic source producing a reconstruction beam;
    (c) means for directing the reconstruction beam at the hologram; and
    (d) means for aligning the reconstruction beam such that three phase-controlled beams are generated from the of the three phase-controlled point sources, said three phase-controlled beams overlapping each other and interfering with each other to produce an ordered array of electromagnetic beamlets,
    wherein the three point sources are located at the corners of a triangle in a common plane.

2. The apparatus of claim 1, wherein said hologram has been created by directing a reference beam derived from a creation laser source at a holographic medium, deriving three additional non-collimated phase-controlled laser beams from the creation laser source, directing the three additional non-collimated phase-controlled laser beams from a common plane towards the holographic medium, said three additional non-collimated phase controlled laser beams comprising an object beam, said object and reference beams combining at the holographic medium to form an interference pattern, said interference pattern being recorded as said hologram.

3. The apparatus of claim 2, wherein, during creation of the hologram, the reference beam and the three additional non-collimated phase-controlled laser beams are derived from the creation laser source by means comprising at least two beamsplitters and a mirror.

4. The apparatus of claim 2, wherein, during creation of the hologram, the reference beam and the three non-collimated phase-controlled laser beams are derived from the creation laser source by means comprising at least two fiber-optic beamsplitters.

5. The apparatus of claim 2, wherein the wavelength of the reconstruction laser source is the same as the wavelength of the creation laser source.

6. The apparatus of claim 2, wherein the wavelength of the reconstruction laser source is different from the wavelength of the creation laser source.

7. The apparatus of claim 1, wherein the means for directing the reconstruction laser beam at the hologram comprises an optical fiber.

8. The apparatus of claim 1, wherein the hologram is generated by a computer.

9. The apparatus of claim 8, wherein the hologram is calculated from the interference of a first beam from a first source having a first wavelength and a second beam from a second source also having the first wavelength, said second beam comprising three phase-controlled beams, and the wavelength of the reconstruction source is the same as the first wavelength.

10. The apparatus of claim 8, wherein the hologram is calculated from the interference of a first beam from a first source having a first wavelength and a second beam from a second source also having the first wavelength, said second beam comprising three phase-controlled beams, and the wavelength of the reconstruction source is different from the first wavelength.

11. The apparatus of claim 1, further comprising a spatial light modulator, said spatial light modulator positioned to modulate the beams in the ordered array of electromagnetic beamlets.

12. A method for generating an array of electromagnetic beamlets comprising:
   (a) directing a reference beam derived from a creation source at a holographic medium, said reference beam having a first orientation with respect to the holographic medium;
   (b) deriving three additional phase-controlled beams from the creation source;
   (c) directing the three additional phase-controlled beams towards the holographic medium, said three additional phase-controlled beams comprising an object beam, said object and reference beams combining at the holographic medium to form an interference pattern, said interference pattern being recorded as a hologram;
   (d) directing a reconstruction beam derived from a reconstruction source at the hologram; and
   (e) aligning the reconstruction beam such that it has the first orientation with respect to the hologram, thus generating three phase-controlled beams from the hologram, said phase-controlled beams overlapping each other and interfering with each other to produce the array of electromagnetic beams, wherein the three point sources are located at the corners of a triangle in a common plane.

13. The method of claim 12, wherein the reconstruction beam is a laser beam directed at the hologram using an optical fiber.

14. The method of claim 12, wherein the reference beam and the three phase-controlled beams are laser beams derived from the creation source using at least one beamsplitter and a mirror.

15. The method of claim 12, wherein the reference beam and the three additional phase-controlled beams are laser beams derived from the creation source using at least two fiber-optic beamsplitters.

16. The method of claim 12, also comprising selecting the reconstruction source such that the wavelength of the reconstruction source is the same as the wavelength of the creation source.

17. The method of claim 12, also comprising selecting the reconstruction source such that the wavelength of the reconstruction source is different from the wavelength of the creation source.

18. The method of claim 12, further comprising modulating the array of beamlets using a spatial light modulator.

19. A three-dimensional imaging system comprising:
   (a) a hologram having a virtual image of a plurality of phase-controlled point sources;
   (b) a laser reconstruction source producing a reconstruction beam;
   (c) means for directing the reconstruction beam towards the hologram;
   (d) means for aligning the reconstruction beam with respect to the hologram such that the plurality of phase controlled beams is generated, said beams overlapping each other and interfering with each other produce an array of laser beamlets originating from the at least two sources is formed;
   (e) means for directing the array of laser beamlets along a first optical axis to a spatial light modulator;
   (f) means for modulating the laser beamlets in at least one spatial light modulator pattern and for directing the modulated laser beamlets at an object;
   (g) a video camera directed along a second optical axis at the object, wherein said second optical axis is not parallel to the first optical axis, said video camera recording a sequence of images of the array of laser beamlets reflected by the object ordered according to the sequence of spatial light modulator patterns; and
   (h) means for calculating a three dimensional image of the object from the sequence of images of the array of laser beamlets.

20. The imaging system of claim 19, wherein the means for modulating the laser beamlets comprises means for modulating the laser beamlets in an ordered binary sequence.

21. The imaging system of claim 19, wherein the hologram was created by directing a reference beam derived from a creation laser source at a holographic medium, deriving at least two phase-controlled additional laser beams from the creation laser source, directing the at least two additional phase-controlled laser beams from a common plane at the holographic medium, said at least two additional phase-controlled laser beams comprising an object beam, said object and reference beams combining at the holographic medium to form an interference pattern, said interference pattern being recorded as the hologram.

22. The imaging system of claim 21, wherein the wavelength of the creation laser source is the same as the wavelength of the reconstruction laser source.

23. The imaging system of claim 21, wherein the wavelength of the creation laser source is different from the wavelength of the reconstruction laser source.

24. The imaging system of claim 21, wherein the means for directing the reconstruction laser beam at the hologram comprises a optical fiber.

25. The imaging system of claim 21, wherein the at least two additional phase-controlled laser beams are derived from the creation laser source by means comprising fiber-optic beamsplitters.

26. The imaging system of claim 21, wherein the at least two additional phase-controlled laser beams are derived from the creation laser source by means comprising optical fibers and beamsplitters.

27. The imaging system of claim 21, wherein the at least two phase-controlled point sources are three phase-controlled point sources located at the corners of a triangle in the common plane.

28. The imaging system of claim 19, wherein the at least two phase-controlled point sources are four phase-controlled point sources located at the corners of a rectangle in the common plane.

29. The imaging system of claim 19, wherein the hologram is generated by a computer.

30. A three-dimensional imaging system comprising:
   (a) a hologram having a virtual image of a plurality of phase-controlled point sources;
   (b) a reconstruction laser source producing a reconstruction beam;
   (c) means for directing the reconstruction laser beam at the hologram;
   (d) means for aligning the reconstruction beam with respect to the hologram such that the plurality of phase controlled beams are produced, said beams overlapping each other and interfering with each other to produce an array of laser beamlets;

(e) means for directing the array of laser beamlets along a first optical axis at an object;

(f) a video camera directed along a second optical axis at the object, wherein said second optical axis is not parallel to the first optical axis, said video camera comprising means for recording at least one coded image of the array of laser beamlets reflected by the object; and (g) means for calculating a three dimensional image of the object from the at least one coded image of the array of laser beamlets reflected by the object.

31. The three dimensional imaging system of claim 30, wherein the hologram is created using means comprising optical fibers.

32. The three dimensional imaging system of claim 30, wherein the hologram was created by directing a spatially coded reference beam derived from a creation laser source at a holographic medium, deriving the plurality of additional phase-controlled laser beams from the creation laser source, directing the plurality of additional phase-controlled laser beams from a common plane at a coded spatial light modulator and then at the holographic medium, said plurality of additional phase-controlled laser beams comprising an object beam coded by the coded spatial light modulator, said coded object beam and coded reference beam combining at the holographic medium to form an interference pattern, said interference pattern being recorded as the hologram.

33. The three dimensional imaging system of claim 32, wherein the wavelength of the reconstruction laser source is the same as the wavelength of the creation laser source.

34. The three dimensional imaging system of claim 32, wherein the wavelength of the reconstruction laser source is different from the wavelength of the creation laser source.

35. The three dimensional imaging system of claim 32, wherein the plurality of additional phase-controlled laser beams are derived from the creation laser source, by means comprising optical fibers.

36. The three dimensional imaging system of claim 30, wherein the hologram comprises a virtual image of three phase-controlled point sources located at the corners of a triangle in the common plane.

37. The three dimensional imaging system of claim 36, wherein the hologram comprises a virtual image of four point phase-controlled point sources located at the corners of a rectangle in the common plane.

38. The three dimensional imaging system of claim 30, wherein the hologram is generated by a computer.

39. A method for obtaining a three dimensional image of an object comprising:

(a) directing a reference beam derived from a creation laser source at a holographic medium;

(b) deriving a first plurality of at least two additional phase-controlled beams from the creation laser source;

(c) directing the first plurality of additional phase-controlled beams at the holographic medium from a common plane, said first plurality of additional phase-controlled beams combining with the reference beam at the holographic medium to form a hologram comprising a virtual image of the first plurality of phase-controlled point sources;

(d) directing a reconstruction beam from a reconstruction laser source at the hologram comprising a virtual image of the first plurality of phase-controlled point sources, said reconstruction beam having the same orientation relative to the hologram as the reference beam had relative to the holographic medium, thereby generating a first plurality of phase-controlled laser beams, said phase controlled laser beams overlapping with each other and interfering with each other to produce an array of laser beamlets;

(e) directing the array of laser beamlets at a spatial light modulator, and then directing the array of laser beamlets along a first optical axis at an object;

(f) directing a video camera along a second optical axis at the object, said second optical axis being non-parallel to the first optical axis;

(g) recording at least one image of the reflection of the array of laser beamlets; and (h) calculating a three dimensional image of the object from the at least one image.

40. The method of claim 39, wherein step (e) further comprises spatially modulating the array of laser beamlets to produce a coded array of laser beamlets, and step (g) comprises recording at least one coded image of the reflection of the array of laser beamlets.

41. The method of claim 40, wherein the array of laser beamlets is modulated by the spatial light modulator in an ordered binary sequence of spatial light modulator patterns.

42. The method of claim 39, wherein the first plurality of at least two additional beams is derived from the creation laser source by means comprising optical fibers.

43. The method of claim 39, wherein the first plurality of at least two additional phase-controlled beams is derived from the creation laser source by means comprising optical fiber beamsplitters.

44. The method of claim 39, wherein the first plurality is three, and the three additional phase-controlled beams are directed at the holographic medium from the corners of a triangle in the common plane.

45. The method of claim 39, wherein the first plurality is four, and the four additional phase-controlled beams are directed at the holographic medium from the corners of a rectangle in the common plane.

46. The method of claim 39, wherein the wavelength of the construction laser source is the same wavelength as the wavelength of the creation laser source.

47. The method of claim 39, wherein the wavelength of the reconstruction laser source is different from the wavelength of the creation laser source.

48. A method for obtaining a three dimensional image of an object comprising:

(a) directing a spatially coded reference beam derived from a creation laser source at a holographic medium;

(b) deriving a first plurality of at least two additional phase-controlled beams from the creation laser source;

(c) coding the first plurality of at least two additional phase-controlled beams;

(d) directing the first plurality of coded additional phase-controlled beams at the holographic medium from a common plane, said first plurality of coded additional phase-controlled beams combining with the coded reference beam at the holographic medium to form a hologram comprising a coded image of the first plurality of point sources;

(e) directing a reconstruction beam from a reconstruction laser source at the hologram comprising a coded image of the first plurality of point sources, said reconstruction beam having the same orientation relative to the hologram as the reference beam had relative to the holographic medium, thereby generating the first plurality of phase-controlled_beams, said phase-controlled beams overlapping with and interfering with each other to produce a coded array of laser beamlets;

(f) directing the coded array of laser beamlets along a first optical axis at an object;

(g) directing a video camera along a second optical axis at the object, said second optical axis being non-parallel to said first optical axis;

(h) recording at least one coded image of the reflection of the coded array of laser beamlets; and (i) calculating a three dimensional image of the object from the at least one coded image.

49. The method of claim 48, wherein the reference beam and the first plurality of at least two additional phase-controlled beams are coded in an ordered binary sequence.

50. The method of claim 48, wherein the reference beam and the first plurality of at least two additional phase-controlled beams are derived from the creation laser source by means comprising optical fiber beamsplitters.

51. The method of claim 48, wherein the reference beam and the first plurality of at least two phase-controlled additional beams are derived from the creation laser source by means comprising optical fibers.

52. The method of claim 48, wherein the first plurality is three, and the three additional phase-controlled beams are directed at the holographic medium from the corners of a triangle in the common plane.

53. The method of claim 54, wherein the first plurality is four, and the four additional phase-controlled beams are directed at the holographic medium from the corners of a rectangle in the common plane.

54. The method of claim 48, wherein the wavelength of the reconstruction laser source is the same wavelength as the wavelength of the creation laser source.

55. The method of claim 48, wherein the wavelength of the reconstruction laser source is different from the wavelength of the creation laser source.

56. A method for generating an array of electromagnetic beamlets comprising:

(a) calculating a holographic pattern on a computer, said holographic pattern being calculated from the interference of a first source having a first wavelength and a second source also having the first wavelength, said second source consisting of three phase-controlled beams having the first wavelength;

(b) fabricating a hologram by exposing a recording medium to the holographic pattern;

(c) directing a reconstruction electromagnetic beam derived from a reconstruction source at the hologram; and (d) aligning the reconstruction beam such that it has the first orientation with respect to the hologram, and generating three phase-controlled electromagnetic beams, said phase-controlled electromagnetic beams overlapping with each other and interfering with each other to produce an array of electromagnetic beamlets, wherein the three point sources are located at the corners of a triangle in a common plane.

57. The method of claim 56, wherein the wavelength of the reconstruction source is different from the first wavelength.

58. The method of claim 56, wherein the wavelength of the reconstruction source is the same as the first wavelength.

59. An apparatus for generating an array of electromagnetic beamlets comprising:

(a) a hologram having an image of four phase-controlled point sources;

(b) a reconstruction electromagnetic source producing a reconstruction beam;

(c) means for directing the reconstruction beam at the hologram; and (d) means for aligning the reconstruction beam such that four phase-controlled beams are generated from the virtual image of the four phase-controlled point sources, said first plurality of phase-controlled beams overlapping each other and interfering with each other to produce an ordered array of electromagnetic beamlets, wherein the four point sources are located at the corners of a rectangle in a common plane.

60. The apparatus of claim 59, wherein said hologram has been created by directing a reference beam derived from a creation laser source at a holographic medium, deriving four additional non-collimated phase-controlled laser beams from the creation laser source, directing the four additional non-collimated phase-controlled laser beams from a common plane towards the holographic medium, said four additional non-collimated phase-controlled laser beams comprising an object beam, said object and reference beams combining at the holographic medium to form an interference pattern, said interference pattern being recorded as said hologram.

61. The apparatus of claim 60, wherein, during creation of the hologram, the reference beam and the four additional non-collimated phase-controlled laser beams are derived from the creation laser source by means comprising at least two beamsplitters and a mirror.

62. The apparatus of claim 60, wherein, during creation of the hologram, the reference beam and the four additional non-collimated phase-controlled laser beams are derived from the creation laser source by means comprising at least two fiber-optic beamsplitters.

63. The apparatus of claim 60, wherein the wavelength of the reconstruction laser source is the same as the wavelength of the creation laser source.

64. The apparatus of claim 60, wherein the wavelength of the reconstruction source is different from the wavelength of the creation laser source.

65. The apparatus of claim 59, wherein the means for directing the reconstruction laser beam at the hologram comprises an optical fiber.

66. The apparatus of claim 59, wherein the hologram is generated by a computer.

67. The apparatus of claim 66, wherein the hologram is calculated from the interference of a first beam from a first source having a first wavelength and a second beam from a second source also having the first wavelength, said second beam comprising four phase-controlled beams, and wherein the wavelength of the reconstruction source is the same as the first wavelength.

68. The apparatus of claim 66, wherein the hologram is calculated from the interference of a first beam from a first source having a first wavelength and a second beam from a second source also having the first wavelength, said second beam comprising four phase-controlled beams, and wherein the wavelength of the reconstruction source is different from the first wavelength.

69. An apparatus for generating an array of electromagnetic beamlets comprising:

(a) a hologram having an image of a first plurality of at least two phase-controlled point sources;

(b) a reconstruction electromagnetic source producing a reconstruction beam;

(c) means for directing the reconstruction beam at the hologram; and (d) means for aligning the reconstruction beam such that a first plurality of phase-controlled beams is generated from the virtual image of the first plurality of at least two phase-controlled point sources, said first plurality of phase-controlled beams overlapping each other and interfering with each other to produce an ordered array of electromagnetic beamlets; and (e) a spatial light modulator, said spatial light modulator positioned to modulate the beams in the ordered array of electromagnetic beamlets.

70. The apparatus of claim 69, wherein said hologram has been created by directing a reference beam derived from a creation laser source at a holographic medium, deriving a first plurality of additional non-collimated phase-controlled laser beams from the creation laser source, directing the first plurality of additional non-collimated phase-controlled laser beams from a common plane towards the holographic medium, said first plurality of additional non-collimated phase-controlled laser beams comprising an object beam, said object and reference beams combining at the holographic medium to form an interference pattern, said interference pattern being recorded as said hologram.

71. The apparatus of claim 70, wherein, during creation of the hologram, the reference beam and the first plurality of additional non-collimated phase-controlled laser beams are derived from the creation laser source by means comprising at least two beamsplitters and a mirror.

72. The apparatus of claim 70, wherein, during creation of the hologram, the reference beam and the first plurality of additional non-collimated phase-controlled laser beams are derived from the creation laser source by means comprising at least two fiber-optic beamsplitters.

73. The apparatus of claim 70, wherein the wavelength of the reconstruction laser source is the same as the wavelength of the creation laser source.

74. The apparatus of claim 70, wherein the wavelength of the reconstruction laser source is different from the wavelength of the creation laser source.

75. The apparatus of claim 69, wherein the means for directing the reconstruction laser beam at the hologram comprises an optical fiber.

76. The apparatus of claim 69, wherein the hologram is generated by a computer.

77. The apparatus of claim 76, wherein the hologram is calculated from the interference of a first beam from a first source having a first wavelength and a second beam from a second source also having the first wavelength, said second beam comprising a first plurality of at least two phase-controlled beams, and the wavelength of the reconstruction source is the same as the first wavelength.

78. The apparatus of claim 76, wherein the hologram is calculated from the interference of a first beam from a first source having a first wavelength and a second beam from a second source also having the first wavelength, said second beam comprising a first plurality of at least two phase-controlled beams, and the wavelength of the reconstruction source is different from the first wavelength.

79. A method for generating an array of electromagnetic beamlets comprising:

(a) directing a reference beam derived from a creation source at a holographic medium, said reference beam having a first orientation with respect to the holographic medium;

(b) deriving four additional phase-controlled beams from the creation source;

(c) directing the four additional phase-controlled beams towards the holographic medium, said four additional phase-controlled beams comprising an object beam, said object and reference beams combining at the holographic medium to form an interference pattern, said interference pattern being recorded as a hologram;

(d) directing a reconstruction beam derived from a reconstruction source at the hologram; and (e) aligning the reconstruction beam such that it has the first orientation with respect to the hologram, thus generating four phase-controlled beams from the hologram, said phase-controlled beams overlapping each other and interfering with each other to produce the array of electromagnetic beams, wherein the four additional laser beams originate from the four corners of a rectangle in a common plane.

80. The method of claim 79, wherein the reconstruction beam is a laser beam directed at the hologram using an optical fiber.

81. The method of claim 79, wherein the reference beam and the four additional phase-controlled beams are laser beams derived from the creation source using at least one beamsplitter and a mirror.

82. The method of claim 79, wherein the reference beam and the four additional phase-controlled beams are laser beams derived from the creation source using at least two fiber-optic beamsplitters.

83. The method of claim 79, also comprising selecting the reconstruction source such that the wavelength of the reconstruction source is the same as the wavelength of the creation source.

84. The method of claim 79, also comprising selecting the reconstruction source such that the wavelength of the reconstruction source is different from the wavelength of the creation source.

85. A method for generating an array of electromagnetic beamlets comprising:

(a) directing a reference beam derived from a creation source at a holographic medium, said reference beam having a first orientation with respect to the holographic medium;

(b) deriving a first plurality of at least two additional phase-controlled beams from the creation source;

(c) directing the first plurality of additional beams phase-controlled towards the holographic medium, said first plurality of additional phase-controlled beams comprising an object beam, said object and reference beams combining at the holographic medium to form an interference pattern, said interference pattern being recorded as a hologram;

(d) directing a reconstruction beam derived from a reconstruction source at the hologram; and (e) aligning the reconstruction beam such that it has the first orientation with respect to the hologram, thus generating a first plurality of phase-controlled beams from the hologram, said phase-controlled beams overlapping each other and interfering with each other to produce the array of electromagnetic beams; and (f) modulating the array of beamlets using a spatial light modulator.

86. The method of claim 85, wherein the reconstruction beam is a laser beam directed at the hologram using an optical fiber.

87. The method of claim 85, wherein the reference beam and the first plurality of additional phase-controlled beams are laser beams derived from the creation source using at least one beamsplitters and a mirror.

88. The method of claim 85, wherein the reference beam and the first plurality of additional phase-controlled beams are laser beams derived from the creation source using at least two fiber-optic beamsplitters.

89. The method of claim 85, also comprising selecting the reconstruction source such that the wavelength of the reconstruction source is the same as the wavelength of the creation source.

90. The method of claim 85, also comprising selecting the reconstruction source such that the wavelength of the reconstruction source is different from the wavelength of the creation source.

91. A method for generating an array of electromagnetic beamlets comprising:

(a) calculating a holographic pattern on a computer, said holographic pattern being calculated from the interference of a first source having a first wavelength and a second source also having the first wavelength, said second source consisting of four phase-controlled beams having the first wavelength;

(b) fabricating a hologram by exposing a recording medium to the holographic pattern;

(c) directing a reconstruction electromagnetic beam derived from a reconstruction source at the hologram; and (d) aligning the reconstruction beam such that it has the first orientation with respect to the hologram, and generating the four phase-controlled electromagnetic beams, said phase-controlled electromagnetic beams overlapping with each other and interfering with each other to produce an array of electromagnetic beamlets, wherein the four point sources are located at the corners of a rectangle in a common plane.

92. The method of claim 91, wherein the wavelength of the reconstruction source is different from the first wavelength.

93. The method of claim 91, wherein the wavelength of the reconstruction source is the same as the first wavelength.

* * * * *